Patented Sept. 7, 1937

2,091,965

UNITED STATES PATENT OFFICE 2,091,965

PHENOL RESIN ESTER AND METHOD OF PREPARING

Oscar A. Cherry, Chicago, Ill., assignor to The Glidden Company, Cleveland, Ohio, a corporation of Ohio No Drawing. Application October 25, 1934, Serial No. 749,991

6 Claims. (Cl. 260—4)

This invention relates to synthetic resins of the type obtained by reacting phenols with aldehydes and similar bodies, and has particular reference to the production of resins of this type which possess superior properties, especially as to oil solubility and alkali resistance. More particularly, it refers to a new and improved resin formed by partial or complete esterification of the phenol hydroxyls in the ordinary synthetic resins, with higher fatty acids, to obtain the desired results; and it further refers to a new and novel method of esterifying the phenol hydroxyl groups by reacting them with a low boiling acid anhydride and a high boiling fatty acid.

Phenolic resins have been used extensively in the arts for upwards of 20 years. They are ordinarily produced by reaction of phenols and aldehydes or other bodies containing reactive methylene groups, with or without diluents or modifying agents.

While used extensively in the field of plastics, the role of phenolic resins in the coating industry was very slight for years, due to their lack of oil solubility. Many methods were suggested to render these resins oil soluble; but most of them were unsuccessful. Treatment with an excess of rosin had the desired result; the resin, of course, was substantially modified. Esterification of the excess rosin with glycerol resulted in the well known "Albertol" type resin, which immediately found favor with the paint industry for the production of four-hour enamels.

While the rosin ester gum reduced resin met with some success, the so called pure phenolic resins were still not oil soluble. This problem has been successfully solved by the use of substituted phenols (p-phenyl phenol, p-tertiary amyl phenol, etc.). These phenols, however, are expensive; and further research has been necessary.

The esterification of the free phenol hydroxyls has been undertaken both in an attempt to solve this problem and from other viewpoints. Simple esterification, with the free acids, gives high acid number products which are not oil soluble. Esterification with the lower fatty acid anhydrides, and various acid chlorides, has been successful in producing esters of the phenolic resins, but the products obtained have not been satisfactory for use in paints and varnishes. The use of excess rosin, followed by glycerol, represents the first successful use of the esterification reaction to produce oil soluble resins; the resin, of course, is not merely a phenolic resin ester, but contains rosin and glycerol in the complex.

While the simple phenolic resin esters of the lower fatty acids have been prepared, the acids of the higher fatty acids (among others such as are obtained by the hydrolysis of fatty oils) have heretofore not been prepared, due to the fact that the anhydrides do not yield esters with phenolic resins, while the difficulty of preparation of the chlorides of these acids is prohibitive to any attempt to use them on a commercial scale. I have discovered that when such esters are prepared, the products obtained are oil soluble; and that even the partial esters may be used to advantage. I have further discovered a new and novel method of conducting esterification reactions, whereby these esters may be produced simply and economically.

The process comprises, essentially, the heat treatment of a mixture of a phenolic resin, a relatively low boiling organic acid anhydride and a high boiling carboxylic acid. During the course of the reaction the acid from which the low boiling acid anhydride was obtained is evolved and the high boiling acid unites with the phenolic resin to form the desired ester.

Illustrative examples will now be given to clarify the above statements and to furnish specific embodiments of the invention. These examples, however, are not to be construed as limiting the invention, the scope of which is defined by the appended claims.

Example 1

A phenolic resin is prepared from 730 parts of a cresylic acid fraction boiling between 215 and 225° C., 520 parts of a cresylic acid fraction boiling between 208 and 218° C. and 700 parts of 40% formaldehyde in the presence of an acid and by known methods. In this and in the following examples parts by weight are meant. The resin is dehydrated by heating to a suitably high temperature, say 200° C.

To 100 parts of such a resin are added 60 parts of acetic anhydride, 100 parts of tung oil fatty acids and 50 parts of linseed oil fatty acids. The whole is placed in a distilling flask and heated. The distilling flask is preferably equipped with a distilling tube or rectifying column of such length that during the distillation acetic acid may escape from the flask and of such length that acetic anhydride is condensed and returned to the reaction flask. Of course, the rate of distillation may be regulated by control of the heating means to aid in this result.

As the heating proceeds a homogeneous solution is formed and later acetic acid begins to distill. The distillation is continued until a quantity of acetic acid corresponding approximately to the amount theoretically to be obtained by hydration of the acetic anhydride originally taken is collected. In order to obtain this quantity of distillate it is necessary to raise the temperature finally to approximately 280° C. The time required at this temperature is relatively short.

The product so obtained is, when cold, a viscous liquid completely soluble in benzol, toluol and mineral spirits and somewhat less soluble in alcohol. The product contains unesterified phenolic hydroxyl groups and is therefore somewhat affected by alkalies. Since it is a partial ester of a drying oil fatty acid, the product dries in the presence of metallic driers such as cobalt acetate.

If the distillation has been carried out as directed, that is, until the stated quantity of acetic acid has been distilled, the acid number of the product will be 20 or less. The acid number may be reduced to practically zero by carrying the distillation sufficiently far. For most purposes it is sufficient to reduce the acid number to 20. Because the high boiling acids employed in this process are very weak acids, an acid number of 20 may be considered to represent a substantially neutral product.

*Example 2*

A partial ester is formed as in Example 1 from 100 parts of the phenolic resin above described, 125 parts of tung oil fatty acids and 58 parts of acetic anhydride. The product is slightly more viscous than that of Example 1 and is somewhat less soluble in mineral spirits.

*Example 3*

A phenolic resin is prepared from 160 parts of commercial metapara cresol, 90 parts of a cresylic acid boiling between 208 and 218° C. and 162 parts of 40% formaldehyde in the presence of an acid catalyst. After dehydration 100 parts of the resin are partially esterified by heat treatment as above described in the presence of 20 parts of acetic anhydride and 50 parts of tung oil fatty acids. The resin is plastic at ordinary temperatures, and is practically insoluble in mineral spirits but is soluble in a mixture of benzol and methyl alcohol.

*Example 4*

A phenolic resin is prepared from 250 parts of a cresylic acid fraction consisting largely of ortho cresol with very minor proportions of phenol and metapara cresol and 135 parts of 40% formaldehyde. To 100 parts of this resin are added 60 parts of salicylic acid and 56 parts of acetic anhydride and the whole is distilled as above. The resin is a clear hard product soluble in alcohol but insoluble in mineral spirits. It is also soluble in caustic alkali solutions.

*Example 5*

A phenolic resin is prepared from 1000 parts of a cresylic acid fraction boiling between 215 and 225° C. and 540 parts of 40% formaldehyde by known methods. To 60 parts of the resin are added 30 parts of phenoxy-acetic acid and 22 parts of acetic anhydride. The solution is treated as above described. The ester resembles that obtained by the process of Example 4, but is somewhat less affected by alkalies.

*Example 6*

To 1100 parts of a resin melting at 119° C. (ball and ring method) and prepared from formaldehyde and a mixture of xylenols and tar acids boiling between 208 and 225° C. by known methods are added 1650 parts of rosin and 617 parts of acetic anhydride. The mixture is distilled as described in the previous examples. The product melts at about 102° C. and is soluble in drying oils, in benzol and in a mixture of benzol and alcohol. The distillation should preferably be continued until an acid number of 20 or less is obtained.

*Example 7*

A phenolic resin is prepared from a mixture of 70 parts commercial metapara cresol, 33 parts of high boiling xylenols and 65 parts of 40% formaldehyde. After dehydration the resin is mixed with 235 parts of fish oil fatty acids and 93 parts of acetic anhydride and distilled. The product is a viscous liquid soluble in mineral spirits but insoluble in alcohol and butyl acetate. Since practically all of the hydroxyl groups of the phenolic resin are esterified by the fish oil fatty acids the resin is extremely alkali resistant. Like all esters, however, it,—as well as those previously described,—may be saponified by boiling with 10% caustic soda solutions.

*Example 8*

Seventy parts of a resin made from a mixture of 95% phenol and 5% orthocresol and formaldehyde in the presence of oxalic acid as a catalyst, 100 parts of propionic anhydride and 142 parts of lauric acid were heated together under conditions which would allow the escape of propionic acid and which would prevent the escape of substantial amounts of propionic anhydride. During the heat treatment the temperature was raised gradually to 300° C. When the distillation of propionic acid had almost ceased the liquid was allowed to cool and was then subjected to reduced pressure (35 mm. of mercury) while being heated to 250° C. The final product was a viscous liquid, soluble in coal tar solvents, mineral spirits, drying oils, butyl acetate. It had an acid number of 26. The ester has about 70% of its hydroxyl groups esterified by lauric acid.

*Example 9*

One hundred parts of a phenolic resin prepared as for Example 8 were heated with 200 parts crude abietic acid, 10 parts of benzoic acid, 50 parts of cocoanut oil fatty acids and 150 parts of monochloroacetic anhydride. The heating was conducted under such conditions and with such a fractionating column as to allow the escape of chloroacetic acid as formed and as to prevent the distillation of substantial amounts of chloroacetic anhydride. The temperature was raised gradually to 320° C. and then the liquid was allowed to cool to 270° C. Reduced pressure (5 mm. of mercury) was then applied and the distillation was then continued while the temperature of the melt was raised to 300° C. The resulting partial ester was resinous in character being brittle at room temperature. It was soluble in butyl acetate and toluol and insoluble in mineral spirits. It was not precipitated from solution in tung oil by the quantity of mineral spirits ordinarily used in varnish making.

*Example 10*

A resin is prepared from 94 parts of phenol and 65 parts of 40% formaldehyde. To this resin are added 275 parts of rosin and 110 parts of acetic anhydride, and the mixture is distilled.

The product is a clear hard resin resembling in its solubility characteristics and in its resistance to alkalies the resin described in Example 7.

It will be noted that in all of the above examples wherein drying oil fatty acids esters of phenolic resins are formed, the phenol used in the preparation of the original resin is a higher boiling homolog of phenol. If phenol itself be used considerable difficulties are encountered due to gelation when an attempt is made to form a drying oil fatty acid ester of the phenol resin.

It has been found that this difficulty may be surmounted by simultaneously combining rosin with the phenol resin. The following examples will make the procedure clear.

Example 11

A phenol resin is prepared from 94 parts of phenol and 65 parts of 40% formaldehyde. This resin is esterified by heating with 200 parts of rosin, 95 parts of fish oil fatty acids and 110 parts of acetic anhydride as described in the previous examples.

Example 12

One hundred parts of a phenol resin prepared as described in Example 11 are esterified by being heated with 100 parts of rosin, 100 parts of linseed oil fatty acids and 70 parts of acetic anhydride.

The tendency to gelation noted in the case of phenol resins may be reduced by the use of some higher boiling homologs of phenol in conjunction with the phenol in the preparation of the original resin. However, the properties due to the phenol are thereby modified.

Example 13

One hundred and fifteen parts of a phenolic resin made from a mixture of phenol and orthocresol in the proportions of 95 to 5, respectively, and formaldehyde in the presence of an acid, and having a melting point (ball and ring method) of 108° C., were mixed with 115 parts of acetic anhydride and 144 parts of n-caprylic acid. The mixture was heated gradually under conditions of distillation which permitted the distillation of acetic acid and which prevented the distillation of any substantial amounts of acetic anhydride. The temperature of the mixture was thus gradually raised to 300° C. The ester was then allowed to cool to 200° C. and was then distilled under reduced pressure (10 mm. of mercury) while the temperature was being raised to 220° C. This latter distillation was carried on without any fractionation of the volatile matter. The resulting ester was a brownish, translucent, very viscous liquid. It is soluble in drying oils, mineral spirits, aromatic hydrocarbons and ethyl acetate. It had an acid number of 6.0. This ester is a substantially complete ester. That is to say, substantially all of the phenolic hydroxyl groups are believed to be esterified by n-caprylic acid.

Dibasic acids may replace a portion of the mono-basic acid in the examples I have given. However, the amount that may be used is quite limited on account of the fact that too large an amount of the dibasic acid promotes infusibility and insolubility of the ester. The following examples will, I believe, exemplify the limitations.

Example 14

One hundred and three parts of a phenol-formaldehyde resin made in the presence of an acid by known methods, were mixed with 70 parts of linseed oil fatty acids, 90 parts of sweated Congo gum, 201 parts of rosin and 108 parts of acetic anhydride. The mixture was distilled according to the general method to produce a substantially complete mixed ester.

It is well known, of course, that Congo gum contains dibasic acids. The amount used in the above experiment was insufficient to produce insolubility or infusibility in the final products. In the above examples, there were, theoretically, about 8% of the phenolic hydroxyl groups esterified by dibasic resin acids.

Example 15

In another experiment 79 parts of the phenol resin were distilled with 88 parts of acetic anhydride, 225 parts of rosin and 75 parts of sweated Congo gum, to form a partial ester. In this case there were probably about 11% of the phenolic hydroxyl groups esterified by dibasic resin acids. The resulting mixed ester was partially gelatinized and was partially insoluble in drying oils.

Example 16

In another case 210 parts of phenolic resin, 330 parts of rosin, 58 parts of maleic acid and 220 parts of acetic anhydride were reacted to form a mixed ester. When the acid number had been reduced to 85, the ester was so viscous that further reaction would undoubtedly have caused gelatin. The ester was insoluble in drying oils. Had it been possible to reduce the acid number to substantially zero, 50% of the phenolic hydroxyl groups would have been esterified by the dibasic acid.

From these and other experiments, it appears to be impractical to attempt the esterification of more than 10% of the phenolic hydroxyl groups of a phenolic resin by a dibasic acid, where an oil soluble product is desired.

In all cases it is preferable to use a quantity of acetic anhydride equivalent approximately molecularly to the acid the ester of which is desired. If a considerably smaller amount of acetic anhydride is employed the final product will have a rather high acid number. In cases where this is of no importance a deficiency of the anhydride may, of course, be used. If a substantial excess of acetic anhydride is used some acetylization will occur and the final product will contain the acetyl radicle. Since acetic acid esters of phenol resins are readily hydrolyzable by water the use of an excess of anhydride is ordinarily undesirable.

In place of acetic anhydride other low boiling organic acid anhydrides may be used. In general it is undesirable to employ anhydrides boiling substantially above 190° C. when converted to the acid.

Phenolic resin esters may be formed from carboxylic acids boiling substantially above the boiling point of the anhydride used. In general such acids should boil about 200° C., although this point is limited merely to insure getting a complete separation of low boiling acid. In the fatty acid series, I have found that the fatty acids, both saturated and unsaturated, from caprylic acid $CH_3(CH_2)_6.COOH$ through the high fatty acids such as stearic, palmitic, and the mixed fatty acids from various oils, will work well in my process.

In the claims the term "low boiling acid anhydride" is to be construed as limited to the anhydrides of those organic acids which boil at a temperature not substantially exceeding 190° C. at atmospheric pressure.

As shown in the examples a mixture of acids may be used to esterify a phenolic resin. Although the examples have been limited to descriptions of processes wherein a mixture of two or three acids were used for esterification, a greater number may be used when it is desirable to impart special properties to the resin. The term "high boiling carboxylic acid" as used in the claims refers to single acids, or mixtures thereof.

The examples have included descriptions of the formation of both partial and complete esters of phenolic resins. By partial ester is meant a final product which contains both esterified and unesterified phenolic hydroxyl groups and which is therefore capable of reacting under suitable conditions with additional amounts of acids. By a complete ester is meant a final product in which substantially all of the phenolic hydroxyl groups have been esterified.

It has been found that the partial esters referred to may be rendered potentially reactive by the addition of a reactive methylene group containing substance, as for example, the polymers and reactive compounds of formaldehyde. The degree of reactivity will depend upon the amount and character of the methylene group containing substance used, the number of phenolic groups unesterified and upon the character of the phenol employed in making the original phenolic resin. A complete ester cannot be rendered potentially reactive by the addition of aldehydes.

Example 17

To the partial ester obtained by the process of Example 1 is added 2% of paraform. The addition of the paraform should be made at a temperature not greatly exceeding 110° C. or reaction will occur at once. Upon heating this product a reaction occurs whereby the hardness of the product is substantially increased.

Example 18

The addition of 4% of paraform to the product obtained by the practice of Example 3 makes a potentially reactive product that will become substantially infusible upon sufficient heating.

Example 19

The paraform in Example 18 may be replaced by hexamethylenetetramine with similar results.

In order that a potentially reactive product may be obtained from a partial phenolic resin ester it is necessary that substantially one-half of the phenolic hydroxyl groups be unesterified.

Phenolic resins of various sorts may be used as the starting resin but it is essential that they be fusible and soluble in acetic acid.

The fatty acid may be reacted with acetic anhydride to produce a mixed anhydride, before the reaction is commenced; in such case, the mixed anhydride may be used, in sufficient quantity to insure reaction of the higher fatty portion, and volatilization of the acetic portion as acetic acid.

The proportions and specific ingredients, as mentioned in the examples, can of course be changed, and the process modified without departing from the spirit of this invention.

Applicant is aware that it has heretofore been proposed to react simultaneously on a phenolic resin with rosin and acetic anhydride. It has also been proposed to react on a phenolic resin with acetic anhydride and thereafter react on the acetylated resin with rosin. Neutral resins were not thereby obtained and in order to obtain a neutral product it was necessary to subsequently esterify the rosin with glycerol.

In the appended claims the term "phenolic" is used to embrace phenol and its homologs, and the term "phenol" is used to apply to phenol itself. The term "high boiling phenol" is used to designate the homologs of phenol to the exclusion of phenol itself.

In the claims the term "heat treatment" is to be understood as implying such conditions as will permit the escape of the organic acid from which the low boiling organic anhydride is derived and which will prevent substantial amounts of the low boiling organic acid anhydride escaping unchanged.

What I claim is:

1. The process of preparing an ester of a phenolic-methylene resin and a carboxylic acid boiling above 200° C., comprising heating a mixture of the resin, the acid and an anhydride of an organic acid boiling below 190° C. under such conditions that the low-boiling acid formed is removed, while the remaining reactants are maintained in the reaction zone.

2. The process of preparing an ester of a phenolic-methylene resin and a carboxylic acid boiling above 200° C., comprising heating a mixture of the resin, the acid and an anhydride of an organic acid boiling below 190° C., equivalent molecularly in quantity to the acid, under such conditions that the low-boiling acid formed is removed, while the remaining reactants are maintained in the reaction zone.

3. The process of preparing an ester of a phenolic-methylene resin and a carboxylic acid boiling above 200° C., comprising heating a mixture of the resin, the acid and an anhydride of an organic acid boiling below 190° C., equivalent molecularly in quantity to the acid, under such conditions that the low-boiling acid formed is removed, while the remaining reactants are maintained in the reaction zone, the high-boiling acid being present in just sufficient quantity to react with all the free phenolic hydroxyl groups in the resin, whereby a substantial neutral ester is obtained.

4. The process of preparing an ester of a phenolic-methylene resin and a carboxylic acid boiling above 200° C., comprising heating a mixture of the resin, the acid, and acetic anhydride under such conditions that the acetic acid formed is removed, while the remaining reactants are maintained in the reaction zone.

5. The process of preparing an ester of a phenolic-methylene resin and a carboxylic acid boiling above 200° C., comprising heating a mixture of the resin, the acid, and acetic anhydride, equivalent molecularly in quantity to the acid, under such conditions that the acetic acid formed is removed, while the remaining reactants are maintained in the reaction zone.

6. The process of preparing an ester of a phenolic-methylene resin and a carboxylic acid boiling above 200° C., comprising heating a mixture of the resin, the acid, and acetic anhydride, equivalent molecularly in quantity to the acid, under such conditions that the acetic acid formed is removed, while the remaining reactants are maintained in the reaction zone, the high-boiling acid being present in just sufficient quantity to react with all the free phenolic hydroxyl groups in the resin, whereby a substantial neutral ester is obtained.

OSCAR A. CHERRY.